US008999016B2

(12) United States Patent
Forsberg et al.

(10) Patent No.: US 8,999,016 B2
(45) Date of Patent: Apr. 7, 2015

(54) FUEL PROCESSOR AND METHOD FOR GENERATING HYDROGEN RICH GAS (75) Inventors: Peter Forsberg, Göteborg (SE); Björn Häggendal, Ytterby (SE); Anders Eriksson, Göteborg (SE); Louise De Verdier, Mölnycke (SE)

(73) Assignee: Powercell Sweden AB, Gothenburg (SE)

( * ) Notice: Subject to any disclaimer, the term of this patent is extended or adjusted under 35 U.S.C. 154(b) by 229 days.

(21) Appl. No.: 13/143,352

(22) PCT Filed: Jan. 7, 2009

(86) PCT No.: PCT/SE2009/000002
§ 371 (c)(1),
(2), (4) Date: Dec. 19, 2011

(87) PCT Pub. No.: WO2010/080054
PCT Pub. Date: Jul. 15, 2010

(65) Prior Publication Data
US 2012/0141366 A1 Jun. 7, 2012

(51) Int. Cl.
*B01J 8/00* (2006.01)
*C01B 6/24* (2006.01)
(Continued)

(52) U.S. Cl.
CPC ............... *C01B 3/363* (2013.01); *B01J 8/0438* (2013.01); *B01J 8/0492* (2013.01); *B01J 8/0496* (2013.01); *C01B 3/382* (2013.01); *C01B 3/48* (2013.01);
(Continued)

(58) Field of Classification Search
USPC .......... 48/61; 422/625–629; 423/644
See application file for complete search history.

(56) References Cited

U.S. PATENT DOCUMENTS 6,241,792 B1 * 6/2001 Schuessler et al. ...... 48/197 FM
6,783,741 B2 * 8/2004 Edlund et al. ................ 422/617
(Continued)

FOREIGN PATENT DOCUMENTS

EP 1057780 A2 6/2000
WO 9965097 A1 12/1999
(Continued)

OTHER PUBLICATIONS

International Search Report for corresponding International Application PCT/SE2009/000002.

*Primary Examiner* — Matthew Merkling
(74) *Attorney, Agent, or Firm* — WRB-IP LLP (57) ABSTRACT A fuel processor for generating hydrogen rich gas or cleaned hydrogen rich gas from hydrocarbon fuel includes an inner housing and an outer housing defining a mantel space between them, wherein at least one fuel reformer unit for reforming hydrocarbon fuel to a hydrogen rich gas and optionally a gas-cleaning unit for cleaning the hydrogen rich gas from unwanted by-products are arranged in the inner housing. The fuel processor further includes a processor inlet for introducing hydrocarbon fuel into the inner housing and a processor outlet for releasing cleaned hydrogen rich gas from the inner housing. The outer housing further includes a fluid inlet for introducing a heat transporting fluid into the mantel space. The inner housing includes at least one opening for providing a fluid-connection between the inner housing and the mantel space. A method for operating such a fuel processor is also provided.

12 Claims, 3 Drawing Sheets (51) Int. Cl.
*C01B 3/02* (2006.01)
*C01B 3/36* (2006.01)
*B01J 8/04* (2006.01)
*C01B 3/38* (2006.01)
*C01B 3/48* (2006.01)
*H01M 8/06* (2006.01)
*H01M 8/10* (2006.01)

(52) U.S. Cl.
CPC .......... *H01M 8/0618* (2013.01); *H01M 8/0631* (2013.01); *B01J 2208/00168* (2013.01); *B01J 2208/00212* (2013.01); *B01J 2208/00362* (2013.01); *B01J 2208/0053* (2013.01); *B01J 2208/00646* (2013.01); *B01J 2208/00716* (2013.01); *C01B 2203/0244* (2013.01); *C01B 2203/0288* (2013.01); *C01B 2203/04* (2013.01); *C01B 2203/044* (2013.01); *C01B 2203/047* (2013.01); *C01B 2203/0485* (2013.01); *C01B 2203/066* (2013.01); *C01B 2203/0883* (2013.01); *C01B 2203/0894* (2013.01); *C01B 2203/1294* (2013.01); *C01B 2203/147* (2013.01); *H01M 2008/1095* (2013.01); *Y02E 60/50* (2013.01); *C01B 2203/1604* (2013.01)

(56) References Cited

U.S. PATENT DOCUMENTS

| | | |
|---|---|---|
| 2004/0047800 A1 | 3/2004 | Sennoun et al. |
| 2006/0185243 A1* | 8/2006 | Kuwabara et al. ........... 48/127.9 |
| 2008/0016767 A1 | 1/2008 | Brantley et al. |

FOREIGN PATENT DOCUMENTS

| | | |
|---|---|---|
| WO | 0022690 A1 | 4/2000 |
| WO | 2004104140 A1 | 12/2004 |

* cited by examiner

FUEL PROCESSOR AND METHOD FOR GENERATING HYDROGEN RICH GAS

BACKGROUND AND SUMMARY

The present invention relates to a fuel processor for generating hydrogen rich gas from hydrocarbon fuel comprising an inner housing having a fuel processor inlet for introducing hydrocarbon fuel into the inner housing and a fuel processor outlet for providing hydrogen rich gas for operating a fuel cell. In the inner housing, at least a fuel reformer unit for reforming hydrocarbon fuel to a hydrogen rich gas and optionally a gas cleaning unit for cleaning the hydrogen rich gas produced by the fuel reformer from unwanted by-products are arranged.

The present invention further relates to a method for operating such a fuel processor.

From the state of the art, e.g. EP 1 057 780, a fuel processor is known, where the reformer unit and subsequent gas cleaning units are integrated into a housing for providing a fuel processor reduced in size. This state of the art further discloses that the reforming section has a front side and a rear side which are separated by a bending section of 180°. Additionally, an insulation layer is formed around the reforming section which is constructed as a double layered structure. The space there between can be filled with a heating catalyst such as iron, copper or zinc, which generates heat by oxidation, when air is supplied to the heating catalyst.

Further, an air supply pipe is provided, which can supply air to the heating catalysts, and a deoxidizing gas supply is provided for leading a deoxidizing gas to the catalyst for terminating the heating. Additionally, a discharge pipe is provided for discharging air and deoxidizing gas, respectively.

By providing deoxidizing gas, such as fuel gas to the heating catalysts the heating of the reformer section can be terminated. This termination takes place as soon as a temperature sensor has sensed that the reformer section has gained its operating temperature.

The disclosed fuel reformer has the disadvantage that not only an oxidizing/deoxidizing gas supply and a discharge possibility needs to be provided, but also the oxidation needs to be stopped by deoxidizing gas. Further, the heating catalysts, namely copper, iron or zinc, increase the overall weight of the fuel reformer. Besides the increased weight, the heat production of the heating catalysts is often not sufficient for bringing the reformer section to operating temperatures of around 800° C. within an acceptable time period.

A further disadvantage of the disclosed fuel reformer is that heat generated during a normal operation of the reformer section cannot be used or transported off, whereby the temperature of the operating fuel processor cannot be regulated.

It is therefore desirable to provide a fuel processor, which provides a simple and effective preheating and a temperature regulating possibility of the fuel processor.

It is also desirable to provide an operating method for a fuel processor, which provides an effective and fast start-up phase of the fuel processor.

Aspects of the invention include a fuel processor, as well as a method for generating hydrogen rich gas.

An aspect of the invention is based on the idea to provide a fuel processor having an inner housing and an outer housing between which a mantel space is defined. The fuel processor further comprises at least one fuel reformer for generating a hydrogen rich gas from hydrocarbon fuel. Optionally, the fuel processor also comprises one or a plurality of gas cleaning units, which are supposed to remove unwanted by-products, such as carbon monoxide, from the generated hydrogen rich gas. Depending on the number and nature of the gas cleaning units and possible further processing units the hydrogen rich gas eventually is converted in a well-known manner into hydrogen gas with a purity required for the respective consumer of the hydrogen, e.g. for the operation of a fuel cell.

Into the mantel space a heat transporting fluid, preferably air, is introduced. A heat transporting fluid in the sense of the invention is any fluid, which is capable of picking up heat at one place and delivering heat to another place. According to a preferred embodiment of the invention, the heat transporting fluid streams from its inlet near the fuel processor outlet to fluid connection openings in the inner housing, which are arranged near the fuel processor inlet. The heat transporting fluid enters the inner housing through the fluid connection openings, mixes with hydrocarbon fuel and streams down to the fuel processor outlet inside the inner housing along with the reformed hydrogen rich gas.

According to an aspect of the invention, the flow direction of the heat transporting fluid during normal operation of the fuel processor is from the heat transporting fluid inlet through the fluid connection openings to the fuel processor outlet. Under the start-up condition of the fuel processor, the flow direction of the heat transporting fluid is reversed, so that the heat transporting fluid enters the inner housing through the fuel processor outlet, streams through the fluid connection openings from the inner housing into the mantel space and leaves the mantel space through the heat transporting fluid inlet. This inventive reversed fluid flow provides a possibility to accelerate the start-up process by providing a fast and effective preheating of the fuel processor.

By the use of a heat transporting fluid, which can be introduced into the inner space of the inner housing and which does not affect the reforming process, no additional discharging supply (as the one known from the state of the art) is needed. Such a heat transporting fluid is e.g. air. The use of air has the further advantage that air needs to be introduced into the inner housing anyhow, as air is necessary for the heating of the fuel reformer. For heating the fuel reformer a small part of the hydrocarbon fuel, which shall be reformed, and ideally all oxygen (from air) are burned, whereby the fuel reformer is kept on its operating temperature between 600° C. and 900° C. Since the air respectively the heat transporting fluid is guided along the outside of the fuel reformer, the fluid also serves as insulation for the fuel reformer. Thereby, no additional insulation is needed, so that the overall costs of the fuel processor can be reduced.

In a further preferred embodiment, the fluid inlet into the outer housing is arranged near the fuel processor outlet, whereby the heat transporting fluid can stream from the cool fluid processor outlet side to the hot reforming section of the fuel processor, whereby it can pick up and transport heat.

In a further preferred embodiment at least one fuel injection nozzle is arranged near the fuel processor inlet for injecting fuel into the mantel space. This fuel can be mixed with air and be ignited, preferably by a spark plug, so that the generated heat heats the reformer section of the fuel processor. The generated high temperature of the burning process can be used to increase the temperature of the fuel reformer rapidly, so that the fuel processor is operable within a short time period.

In a further preferred embodiment, the fuel injection nozzle and the spark plug are arranged near the fuel processor inlet and thereby also near the fuel reformer section.

Additionally, it is advantageous to provide an enlarged mantel space in this area because more fuel can be burned, which in turn speeds up the preheating respectively the start up process.

In a further preferred embodiment, a heat exchanger, preferably a counter flow or cross-flow heat exchanger, is arranged downstream of the reformer section, so that heat can be exchanged between the fluid stream of the mantel space and the fluid stream inside the reformer. This is particularly advantageous during the start up process of the fuel processor, where heat, generated by e.g. the ignition of the fuel/air mixture, is transported to the inside of the fuel reformer.

In a further preferred embodiment, for transporting the heat to the inside of the fuel reformer during the start up phase, the fluid streams inside the mantel space and the inner housing are reversed. That means, the fluid stream inside the inner housing has a direction from the fuel processor outlet to the fuel processor inlet and subsequently enters the mantel space through fluid connection openings in the inner housing. Then, the fluid stream in the mantel space is directed from the fuel processor inlet to the fuel processor outlet and exits the mantel space through the fluid inlet in the outer housing.

Since the ignition takes place in the mantel space, such reversed fluid stream ensures that the heat generated by the ignition can be exchanged to the fluid stream inside the inner housing by the heat exchanger. This in turn means that the fluid stream entering the inside of the reformer is preheated by the heat of the ignited fuel/air mixture. As a result, the fuel processor can be brought to its operating temperature in a very short time period.

The reversed fluid flow has the further advantage that soot generated by burning the fuel for the start up process cannot enter the inside of the fuel reformer and contaminate the reformer catalysts as it will be transported to the heat transporting fluid inlet during the start up process. The temperature during the start up process rapidly increases, so that generated soot will be burned away before the fluid flow direction is re-reversed to its operating direction (from fluid inlet to processor outlet). The heat exchanger itself is not affected by soot, since firstly the heat exchanger is made from a material which is insensitive to soot, and secondly accumulated soot will be burned by the operating temperatures of the reformer during the start up process and is transported off.

Even if the inventive method for operating a fuel processor is described in this application in context of a fuel processor, the inventive method can also be used for operating a fuel reformer, only. Thereby the fuel reformer preferably also has a heat exchanger, which is arranged downstream of the fuel reformer, but no subsequent gas cleaning units. Since a fuel reformer itself is also known as fuel processor in the state of the art, the phrase "fuel processor" herein is used for both—a stand alone fuel reformer and a fuel reformer with subsequent gas cleaning unit(s).

In a further preferred embodiment, at least one further heat exchanger is arranged in the mantel space near the reforming section, and/or the gas cleaning section. Thereby, heat generated during operation of the fuel processor can be used for heating the heat transporting fluid and can be transported off so that the temperatures of the different sections of the fuel processor can be controlled.

It should be noted that a fuel processor has a temperature gradient between the fuel processor inlet and the fuel processor outlet. The fuel processor inlet and the fuel reformer section have temperatures above 600° C., wherein the subsequent gas cleaning units have much lower temperatures. For example, a preferential oxidation unit operates at temperature below 200° C. or even below 100° C.

In a further preferred embodiment of the invention, the arrangement of the fluid inlet near the cool fuel processor outlet and the arrangement of the fluid connection openings near the fuel processor inlet provides the possibility to preheat the heat transporting fluid stream by arranging heat exchangers in the mantel space before it enters the hot section of the fuel processor. Introducing hot air to the inside of the inner housing near the fuel reformer unit has the further advantage that an additional pre-heating element for air is not needed.

Additionally, water, which is necessary for the reforming process and also for the cleaning of the hydrogen rich gas from unwanted by-products, can be preheated by the heat transporting fluid for producing steam. The steam production has the preferred side effect that it cools the heat transporting fluid and thereby also the reactor units inside the inner housing. Thereby, the units can be kept on their optimal operating temperature.

Further advantages and preferred embodiments are defined by the description, the figures and the appending claims.

BRIEF DESCRIPTION OF THE DRAWINGS

In the following, the principle of an aspect of the invention will be explained by means of an illustrated embodiment of the invention. This illustrated embodiment is exemplary only and is not intended to limit the scope of the invention thereto, which is defined by the appending claims only.

The figures show.

DETAILED DESCRIPTION

Figure 1:
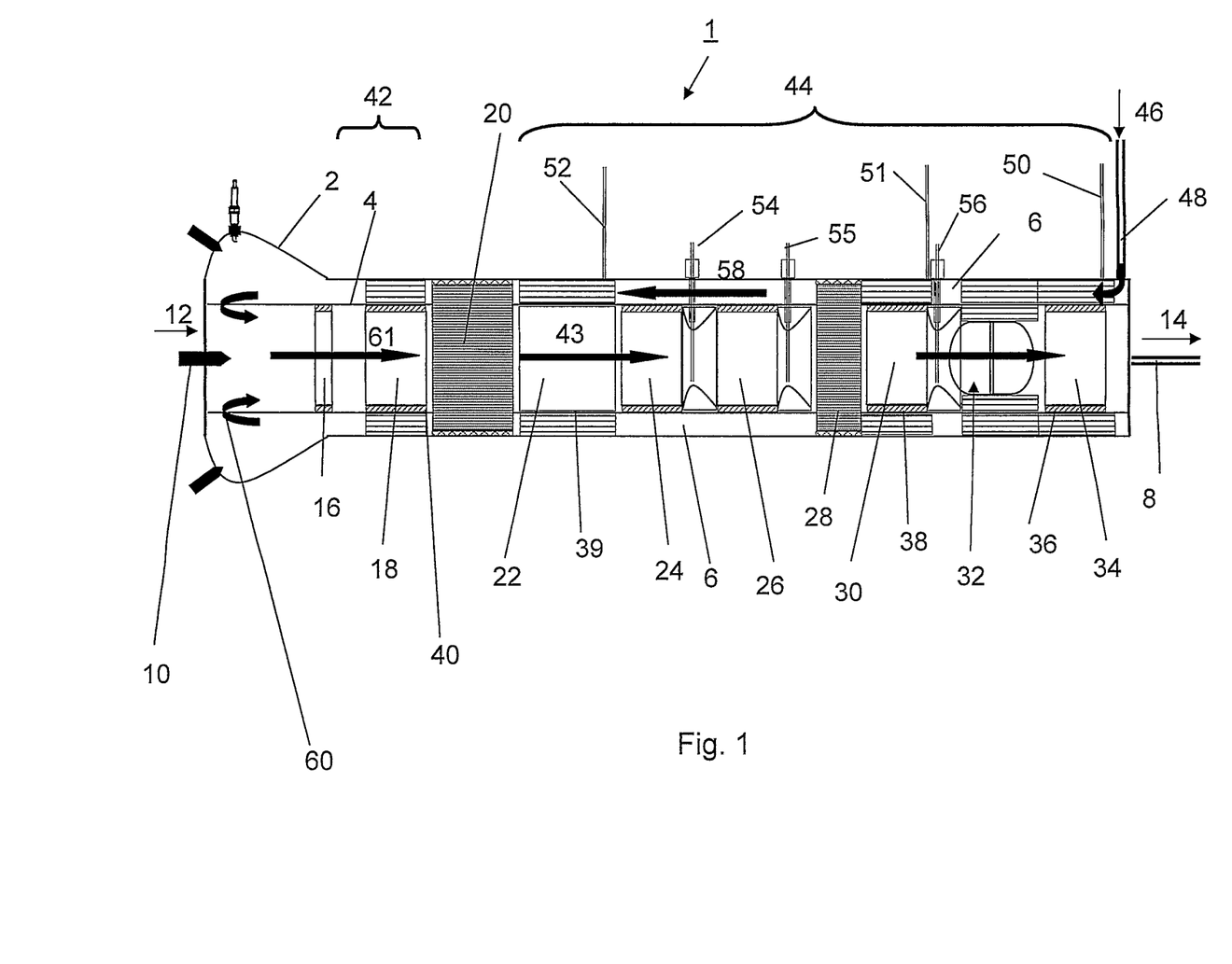
FIG. 1: a schematic illustration of a preferred embodiment of the inventive fuel processor in an operating condition.

FIG. 1 shows a fuel processor 1 under operating conditions. The fuel processor 1 has an outer housing 2 and an inner housing 4, and is preferably cylindrically shaped, whereby the inner housing 4 is designed as tube having a smaller diameter than the outer housing 2 and is mounted, preferably concentrically, inside the outer housing 2. Thereby, a double mantled construction is created. Between outer housing 2 and inner housing 4 there is a mantel space 6, which has, in the illustrated embodiment, an annular shape.

The fuel processor 1 further comprises a fuel processor outlet 8 and a fuel processor inlet 10 so that hydrocarbon fuel 12 can enter the inner housing 4 through fuel processor inlet 10 and cleaned reformed hydrogen rich gas 14 can exit the inner housing 4 through fuel processor outlet 8.

The units necessary for reforming hydrocarbon fuel 12 to cleaned hydrogen rich gas 14 are arranged inside the inner housing 4. In the illustrated embodiment these units are (from left to right) a flame arrester 16, a fuel reformer 18 (preferably of the auto-thermal type), a first heat exchanger 20, a desulphurization unit 22, a high temperature shift reactor 24, a middle temperature shift reactor 26, a second heat exchanger 28, a primary preferential oxidation reactor 30, a third heat exchanger 32, and a secondary preferential oxidation reactor 34. The term "preferential, oxidation" as used herein means a reaction for removing carbon monoxide (CO) from the hydrogen rich gas 14.

Figure 2:
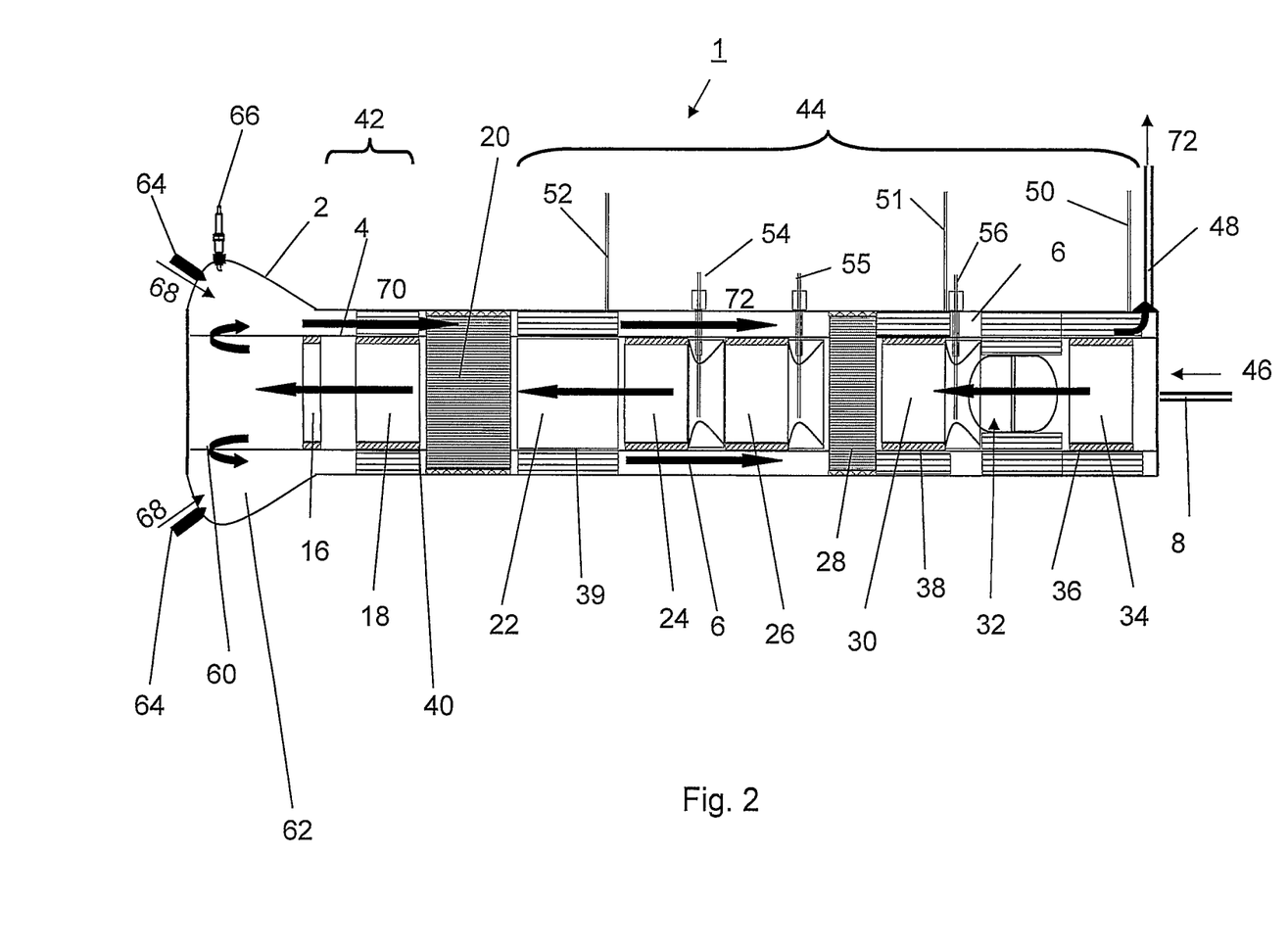
FIG. 2: the inventive fuel processor shown in FIG. 1 in a starting-up condition.

In the mantel space further heat exchangers can be arranged. In the embodiment of FIGS. 1 and 2 the heat exchangers are arranged by way of example as first, second and third mantel space heat exchangers 36, 38 and 39 around the preferential oxidation reactors 30 and 34, and the desulphurization unit 22, respectively. Additionally, a fourth mantel space heat exchanger 40 can be arranged near or around the fuel reformer 18. For easy fitting and removal, the units inside the inner housing 4 can be mounted by hooks.

The fuel processor 1 can be divided into a reforming section 42 comprising the elements for generating a hydrogen rich gas 43 from hydrocarbon fuel 12, which are the flame arrester 16, the auto-thermal fuel reformer 18, and the heat exchanger 40, which surrounds the fuel reformer 18. The hydrogen rich gas 43 generated by the fuel reformer 18 comprises mainly hydrogen, carbon dioxide and water, but also carbon monoxide, which might poise a fuel cell or another hydrogen consumer using the produced hydrogen rich gas 43. Therefore, the produced hydrogen rich gas 43 is cleaned by at least one subsequent gas cleaning reactor.

The other section is the gas cleaning section 44 which comprises all units necessary for cleaning the hydrogen rich gas 43 generated by the fuel reformer 18 from unwanted by-products. This section 44 comprises the desulphurization unit 22 for removing sulphur from the hydrocarbon rich gas 43 generated by the fuel reformer 18. Beside the desulphurization unit 22, the gas cleaning section 44 also comprises units for removing carbon monoxide from the hydrogen rich gas 43. The amount of carbon monoxide needs to be reduced as it might poison a fuel cell (not shown) which shall be operated by the generated cleaned hydrogen rich gas 14 exiting the fuel processor 1 through fuel processor outlet 8. For the removal of carbon monoxide a series of temperature shift reactors 24 and 26 operating at different temperatures have been proven useful. For further reducing the amount of carbon monoxide the preferential oxidation reactors 30 and 34 can be arranged downstream of the shift reactors 24 and 26. The illustrated arrangement of gas cleaning units has proven useful to clean the hydrogen rich gas 43 generated by fuel reformer 18, but any other arrangement and number of gas cleaning units can also be used.

For example, in case a high temperature fuel cell is operated by the generated hydrogen rich gas, it is not necessary to remove carbon monoxide in the same amount as by using a low temperature fuel cell such as a proton exchange membrane (PEM) fuel cell. In case a high temperature fuel cell is operated, the number of carbon monoxide removing units can be reduced significantly, or even left out completely. Then the inventive fuel processor only comprises the fuel reformer section 42 with a downstream arranged heat exchanger 20.

However, irrespective which type of fuel processor designs is used, in general, there is a temperature gradient between the fuel processor inlet and thereby the reforming section 42 and the fuel processor outlet or the gas cleaning section 44. This temperature gradient is due to the fact that the auto-thermal reformer 18 and heat exchanger 20 operate at a temperature of 600° C. to 900° C., wherein the gas cleaning units and the fuel cell itself operate at much lower temperatures. A PEM fuel cell for instance is operated at a temperature of around 80° C.

Therefore, the hydrogen rich gas 43 generated by the fuel reformer 18 needs to be cooled down. According to an aspect of the invention this cooling can be done by leading a heat transporting fluid 46, which is preferably air, through the mantel space 6. For introducing air 46 into mantel space 6, the outer housing 2 comprises a fluid inlet 48. This fluid inlet 48 is preferably arranged near the fuel processor outlet 8. Air 46 then streams (indicated by the black arrows in FIG. 1) from the fluid inlet 48 in opposite direction to the temperature gradient towards the fuel, processor inlet 10, whereby air 46 gets heated. By heating the air 46, heat is also transported from the cooler side of the fuel processor 1 at the gas cleaning section 44 to the hot fuel reforming section 42, whereby the maintenance of the established temperature gradient is supported.

For a better heat exchange between air 46 and the inner housing 4, the mantel space heat exchangers 36, 38, 39 and 40 are provided. For example, such a heat exchanger can be made from a special type of folded thin steel sheets arranged in heat conducting connection at the outer and inner walls of the inner housing. By forcing the hot hydrogen rich gas 43 onto the inner walls of the inner housing 4, the wall and, subsequently, the sheet of the respective mantel space heat exchanger 36, 38, 39, 40 is heated up. In the mantel space 6, the sheet of the respective mantel space heat exchanger 36, 38, 39, 40 emits the heat to the air 46.

Other features, such as an insulation (not shown) for e.g. the desulphurization unit 22, may also be added outside of the inner housing 4. By means of the mantel space heat exchangers 36, 38, 39 and 40, the air can be heated effectively, whereby heat can also effectively be transported from the cooler section of the fuel processor 1 at the gas cleaning section 44 to its hot section at the fuel reformer section 42.

For further regulating the temperature inside of inner housing 4 and the mantel space 6, water providing elements 50, 51 and 52 (mantel space 6), and 54, 55 and 56 (inner housing 4) are provided. Thereby, water providing elements 50, 51, and 52 provide water to the heat exchanging elements 36, 38 and 39, respectively, and thereby also to the air 46. Since the air has a temperature above 100° C., the water introduced to air 46 vaporizes, whereby steam is produced. The vaporization of water in turn cools the so generated air/steam mixture 58, whereby the temperature is regulated. Therefore, by adapting the amount of water which is vaporized, the temperatures of air 46, the hydrogen rich gas 43 and the units inside the inner housing 4 can be regulated.

Preferably, the fourth heat exchanger 40 has no water providing element, since cooling the fuel reformer 18 is not desired. The reason for that is that for keeping the fuel processor 1 at its operating temperature a constant additional heating, e.g. by burning or oxidizing part of the hydrocarbon fuel in the fuel reformer 18 is required—even under operating conditions. In case the fuel reformer 18 is additionally cooled by the vaporization of water, more fuel needs to be burned, which is disadvantageous.

The water providing elements 54, 55, and 56 in the inner housing are further designed to introduce water into the inner housing so that, on the one hand, the reactants, namely water and air, can be introduced to the different units of the gas cleaning section 44 arranged in the inner housing 4. On the other hand, the steam generation cools the hydrogen rich gas, so that the optimal operating temperature for different units of the gas cleaning section 44 can be established and kept.

After having streamed along the gas cleaning section 44 the air/steam mixture 58, enters the heat exchanger 20. The heat exchanger 20 is preferably a counter flow or cross flow heat exchanger. But it should be noted that any heat exchanger can be used which provides a possibility to transfer heat between two fluid streams.

By means of the heat exchanger 20, the air/steam mixture 58 and the gas stream inside the inner housing 4, namely the hydrogen rich gas 43 generated by fuel reformer 18 are put in heat exchanging contact. This has the advantage that the hot hydrogen rich gas 43 generated by the fuel reformer 18 transfers its heat to the cooler air/steam mixture 58, whereby the hydrogen rich gas stream 43 gets cooled down and the air/steam mixture 58 is significantly heated up.

The now hot air/steam mixture 58 then streams along the reformer section 42, where it is further heated by the waste heat of the fuel reformer 18, by means of the heat exchanger 40. On the other hand, the hot air/steam mixture 58 also insulates the reformer section 42 so that the operating temperature inside the reformer section 42 can be kept at a constant high level without any external heater.

After having reached the end of the mantel space 6 near the fuel processor inlet 10, the heated air/steam mixture 58 enters through fluid connection openings 60 provided in the inner housing 4. Inside the inner housing 4, the hot air/steam mixture 58 is mixed with the hydrocarbon fuel 12 to a fuel/air/steam mixture 61. The hydrocarbon fuel 12 is preferably sprayed into the inner housing 4, in order to provide a uniform mixture with the air/steam mixture 58. Additionally, the hydrocarbon fuel 12 can be pre-heated for a better atomization. Preferably, a small part of the hydrocarbon fuel is oxidized in order to keep the fuel reformer 18 at its operating temperature, whereby ideally all oxygen of the introduced air 46 is used for this oxidation process.

Before entering the auto-thermal fuel reformer 18, a flame arrester 16 is arranged, which extinguishes a possibly ignited fuel/air/steam mixture 61. Due to the high temperatures inside the inner housing 4, this flame arrester 16 has the further advantage that liquid hydrocarbon fuel 12 is evaporated by the flame arrester 16, thereby increasing the efficiency of the reforming process.

The fuel/steam/air mixture 61 then enters the fuel reformer 18. In the fuel reformer 18 the hydrocarbon fuel 12 is reformatted to a hydrogen rich gas 43 in a way that is generally known. This reaction takes place at temperatures around 600° C. and 900° C. The hydrogen rich gas 43 comprising hydrogen, carbon monoxide, carbon dioxide and water, exits the fuel reformer 18 and is then led through the first heat exchanger 20 where it gets cooled down by exchanging heat with the air/steam mixture 58 as explained above.

The cooled hydrogen rich gas 43 is then led through the various gas cleaning units of the gas cleaning section 44, where sulphur, carbon monoxide and other unwanted by-products are removed therefrom. The cleaned hydrogen rich gas 14 exiting through fuel processor outlet 8 then mainly comprises hydrogen, carbon dioxide and water, and can therefore be used to operate a fuel cell.

Since, particularly, the temperature shift reactor 26 and the preferential oxidization unit 30 operate at quite different temperatures, it is further advantageous to design the second heat exchanger 28, arranged between the temperature shift reactor 26 and the preferential oxidization unit 30, as counter flow or cross flow heat exchanger. Thereby, heat can effectively be transferred to the air 46 and the hydrogen rich gas 43 can be further cooled down.

In the following a starting up process of the fuel processor 1 will be explained with reference to FIG. 2. Same parts in FIG. 2 are indicated with same reference signs as of FIG. 1. To this end reference is made to the description of FIG. 1 above.

For starting up the fuel processor 1, the flow directions in the inner housing 4 and the mantel space 6 are reversed compared with the flow directions depicted in FIG. 1. That means fuel processor outlet 8 serves as inlet, fuel processor inlet 10 is closed and heat transporting fluid inlet 48 serves as outlet. In the following, the starting up process will be explained for the use of air as a heat transporting fluid, but any other suitable fluid can be used as well. The use of air has the advantage that it is easily accessible and does not contaminate any of the reactors arranged inside the inner housing 4.

It should also be noted that the reversed air flow and the operation method explained in the following can also be used for operating a fuel reformer without integrated gas cleaning units.

For starting up the fuel processor 1, air 46 is introduced through the fuel processor outlet 8 and then led upstream through the inner housing 4 in direction to the now closed fuel processor inlet 10. The stream directions are indicated by black arrows. The introduced air 46 is led through all gas cleaning reactors and heat exchanger 20 in a reversed way. After having reached the end of the reformer section 42, the air 46 streams through the fluid connection openings 60 into the mantel space 6.

As can be seen in FIG. 2, the mantel space 6 is enlarged in the vicinity of the fluid connection openings 60. In this enlarged mantel space 62, by way of example two fuel injection nozzles 64 and a fuel igniting element 66, such as a spark plug, are arranged. In principal, such an enlarged mantel space is not necessary for the heating process, but it provides the possibility to burn more fuel, which in turn increases the heat yield.

The air 46 mixes with fuel 68 injected by fuel injection nozzles 64, whereby a fuel/air mixture is generated, which is ignited by the spark plug 66. Thereby hot exhaust gas 70 is generated which heats the outside of inner housing 4 around the reformer section 42. But, for an effective preheating of the fuel reformer 18, the heat generated by the fuel ignition should also be transported to the inside of the fuel reformer 18.

This transport is performed by heat exchanger 20 through which the hot exhaust gas 70 and the air 46 flow, whereby the air 46 is heated up by the hot exhaust gas 70. The heated air 46 then travels through the fuel reformer 18, whereby the fuel reformer 18 is effectively heated from the inner side.

After having passed the heat exchanger 20, the cooled exhaust gas 72, in turn, is led along the mantel space 6 and the mantel space heat exchangers 39, 28, 38 and 36, where it preheats the gas cleaning units of the gas cleaning section 44 and is further cooled down. Then, the cool exhaust gas 72 exits the fuel processor 1 through heat transporting fluid inlet 48.

This preheating process or start up process has the advantage that soot generated by the ignition of fuel cannot contaminate a catalyst which is arranged inside the, preferably auto-thermal, fuel reformer 18, while the fuel reformer 18 is still be heated by the easily accessible heat of a fuel ignition. The soot generated by the fuel ignition only accumulates in the heat exchanger 22 and the enlarged mantel space 62. After having reached the operating temperature for the fuel processor 1, the accumulated soot is burned away and transported off through fluid inlet 48.

Figure 3:
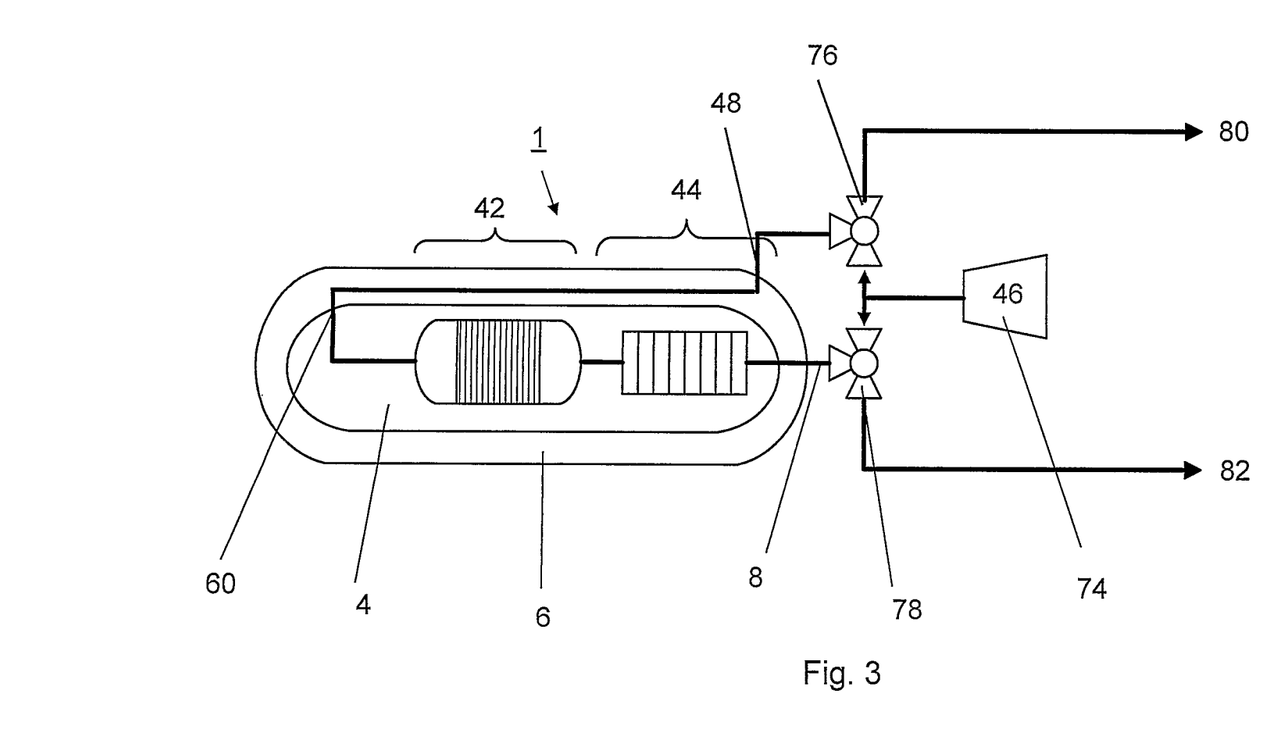
FIG. 3: a schematic illustration of a simplified embodiment of the inventive fuel processor allowing a reversed fluid flow.

FIG. 3 shows a schematic illustration of a simplified embodiment of a fuel processor 1, which is adapted to allow the reversal of the direction of the flow (indicated by the thick black lines) of the heat transporting fluid 46 in the fuel processor 1 from the heat transporting fluid inlet 48 through the at least one opening 60 to the fuel processor outlet 8 or vice versa from the fuel processor outlet 8 through the at least one opening 60 to the heat transporting fluid inlet 48. The heat transporting fluid 46 is stored in a heat transporting fluid supply 74, e.g. a compressor for providing air.

Additionally, two valves, preferably 3-way valves, 76 and 78 are arranged at the heat transporting fluid inlet 48 and at the fuel processor outlet 8, respectively, which are both connected to the heat transporting fluid supply 74. At their other connections, the 3-way valve 76 is connected to the heat transporting fluid inlet 48 and an exhaust 80, wherein the 3-way valve 76 is connected to the fuel reformer outlet 8 and a passage 82 which leads hydrogen rich gas produced in the fuel processor to a hydrogen consumer, e.g. a fuel cell (not shown).

Both 3-way valves 76, 78 are operated simultaneously, e.g. by the same actuator (not shown). During the start-up phase, i.e. under start-up conditions, the valve 78 is operated to be open to the heat transporting fluid supply 74 and closed to the hydrogen rich gas passage 82, wherein the valve 76 is operated to be closed to the heat transporting fluid supply 74 and open to the exhaust 80. Thereby, the fluid flow from the fuel processor outlet 8 through the at least one opening 60 to the heat transporting fluid inlet 48 can be established. Under operating conditions, the valves are controlled so that the valve 76 is operated to be open to the heat transporting fluid supply 74 and closed to the exhaust 80, wherein the valve 78 is operated to be closed to the heat transporting fluid supply 74 and open to the hydrogen rich gas passage 82. Thereby, the fluid flow from the heat transporting fluid inlet 48 through the at least one opening 60 to the fuel processor outlet 8 can be established.

It goes without saying that the shown schematic illustration shows only one simplified embodiment of a fuel processor adapted to allow a reversed fluid flow, and any other embodiment which provided the possibility to reverse the flow of the fluids in mantel space 6 and inner housing 4 are also covered by the scope of the invention.

For easily accessing the fuel processor 1 and the various units and components integrated therein, the inventive fuel processor 1 can further comprise at least one flange (not shown), which is preferably arranged between the reformer section 42 and the gas cleaning section 44. By means of the flange, the fuel processor 1 can be divided into parts and the inside can be easily reached e.g. for maintenance. The use of one or more flanges has the further advantage that the heat exchangers 20, 28, which preferably are counter flow or cross flow heat exchanger blocking the access to the inner housing 4, can be removed completely, whereby the mantel space 6 and the inner housing 4 are easily accessible.

Since the inventive fuel processor 1 uses the developed heat from the included units in a better way than the known fuel processors, it comes closer to an adiabatic fuel processor. Further, the inventive design provides a fuel processor, which is more compact and much simpler in its design, which makes it easier and cheaper to produce. Since the gas cleaning units are integrated in a closed inner housing 4 (as gas cleaning section 44) and not connected by fluid connection elements, the risk of leakage is reduced due to the reduced number of welded or flanged couplings.

As already mentioned above, the described inventive method for operating a fuel processor, wherein the gas flow is reversed during the start up process, can also be used for fuel reformers, only.

Even if the illustrated fuel processor is shown as a straight cylindrically shaped tube, the fuel processor can also be curved in order to save space or can have cross sections different from a tubular one as for example oval or rectangular cross sections. A further advantage of the inventive fuel processor is that it can be easily adapted for different fuels and working conditions. It should be also noted that the shown units and water/air inlets are exemplarily only and any other number and arrangement can be used.

In the present application, the use of terms such as "including" is open-ended and is intended to have the same meaning as terms such as "comprising" and not preclude the presence of other structure, material, or acts. Similarly, though the use of terms such as "can" or "may", is intended to be open-ended and to reflect that structure, material, or acts are not necessary, the failure to use such terms is not intended to reflect that structure, material, or acts are essential. To the extent such structure, material, or acts are presently considered to be essential, they are identified as such.

While this invention has been illustrated ad described in accordance with a preferred embodiment, it is recognized that variations and changes may be made therein without departing from the invention as set forth in the claims.

REFERENCE LIST 1 fuel processor
2 outer housing
4 inner housing
6 mantel space
8 fuel processor outlet
10 fuel processor inlet
12 hydrocarbon fuel
14 hydrogen rich gas
16 flame arrester
18 auto-thermal fuel reformer
20 first heat exchanger
22 desulphurization unit
24 high temperature shift reactor
26 middle temperature shift reactor
28 second heat exchanger
30 primary preferential oxidation reactor
32 third heat exchanger
34 secondary preferential oxidation reactor
36 first mantel space heat exchanger
38 second mantel space heat exchanger
39 third mantel space heat exchanger
40 fourth mantel space heat exchanger
42 fuel reforming section
43 hydrogen rich gas generated by fuel reformer 18
44 gas cleaning section
46 heat transporting fluid, preferably air
48 heat transporting fluid inlet
50, 51, 52 water providing elements to mantel space 6
54, 55, 56 water providing element to inner housing 4
58 air/steam mixture
60 fluid connection openings
61 fuel/air/steam mixture
62 enlarged mantel space
64 fuel injection nozzle
66 spark plug
68 hydrocarbon fuel
70 hot exhaust gas
72 cooled exhaust gas
74 heat transporting fluid supply
76, 78 3-way valves
80 exhaust
82 hydrogen rich gas passage

The invention claimed is:

1. Fuel processor for generating hydrogen rich gas from hydrocarbon fuel comprising
   an inner housing and an outer housing defining a mantel space between them and at least one fuel reformer unit for reforming hydrocarbon fuel to hydrogen rich gas arranged in the inner housing,
   a fuel processor inlet for introducing hydrocarbon fuel into the inner housing arranged at a first side of the inner housing and a fuel processor outlet for releasing hydrogen rich gas from the inner housing arranged at a second side of the inner housing opposite the first side,
   the outer housing further comprising an air inlet for introducing air into the mantel space, the inner housing comprising at least one opening for providing a fluid-connection between the inner housing and the mantel space, and at least a first valve device connected to the fuel processor outlet and adapted to direct the flow of the air in the fuel processor from the air inlet through the at least one opening to the fuel processor outlet or vice versa from the fuel processor outlet through the at least one opening to the air inlet.

2. Fuel processor according to claim 1, wherein the fuel reformer unit is an auto-thermal fuel reformer.

3. Fuel processor according, to claim 1, wherein a heat exchanger (20) for exchanging heat between the fluid stream in the mantel space and the fluid stream inside the inner housing is arranged after the fuel reformer unit.

4. Fuel processor according to claim 1, wherein the fluid streams inside the inner housing and in the mantel space are counter flowing streams.

5. Fuel processor according to claim 1, wherein the air inlet is arranged near the fuel processor outlet and the fluid-connection openings in the inner housing are arranged near the fuel processor inlet.

6. Fuel processor according to claim 1, wherein in the outer housing least one fuel injection nozzle is arranged near the fuel processor inlet for injecting fuel into the mantel space.

7. Fuel processor according to claim 1, wherein in the outer housing at least one fuel igniting element is arranged near the fuel processor inlet for igniting fuel present in the mantel space, wherein the fuel igniting element is arranged near one of the at least one fuel injection nozzle.

8. Fuel processor according to claim 1, wherein the mantel space has an enlarged volume in the vicinity of the fuel processor inlet, which is provided by the outer housing having an enlarged diameter.

9. Fuel processor according to claim 1, further comprising at least one mantel space heat exchanger for exchanging heat between the inner housing and the fluid flowing in the mantel space.

10. Fuel reforming device according to claim 1, wherein at least one further heat exchanger for exchanging heat between the fluid stream in the mantel space and the fluid stream inside the inner housing is provided.

11. Fuel processor according to claim 1, wherein the inner housing further comprises at least one unit of the following group: flame arrester, at least one further fuel reformer, desulphurization unit, high temperature shift reactor, lower temperature shift reactor, preferential oxidation unit, heat exchanger.

12. Fuel processor according to claim 1, wherein at least one fastening element is provided for opening and closing the fuel processor, so that the inside of the inner housing and/or the inside of the mantel space are accessible.

* * * * *